(12) United States Patent
Chew et al.

(10) Patent No.: US 11,303,606 B1
(45) Date of Patent: Apr. 12, 2022

(54) HASHING NAME RESOLUTION REQUESTS ACCORDING TO AN IDENTIFIED ROUTING POLICY

(71) Applicant: Amazon Technologies, Inc., Seattle, WA (US)

(72) Inventors: Chiat Earl Chew, Vancouver (CA); Robert Long, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 16/429,669

(22) Filed: Jun. 3, 2019

(51) Int. Cl.
*H04L 29/12* (2006.01)
*H04L 61/4511* (2022.01)
*H04L 45/48* (2022.01)
*H04L 61/103* (2022.01)
*H04L 45/7453* (2022.01)

(52) U.S. Cl.
CPC .......... *H04L 61/1511* (2013.01); *H04L 45/48* (2013.01); *H04L 45/7453* (2013.01); *H04L 61/103* (2013.01)

(58) Field of Classification Search
CPC ... H04L 45/48; H04L 45/7453; H04L 61/103; H04L 61/1511
See application file for complete search history.

(56) References Cited

U.S. PATENT DOCUMENTS

| 7,769,826 B2 | 8/2010 | Gustafsson |
| 8,630,988 B2 | 1/2014 | Balogh |
| 9,219,705 B2 | 12/2015 | Heinson et al. |
| 9,948,527 B1 * | 4/2018 | Bryan ..................... G06F 16/23 |
| 2020/0137138 A1 * | 4/2020 | Rice .................... G06F 16/9566 |

* cited by examiner

*Primary Examiner* — Gil H. Lee
(74) *Attorney, Agent, or Firm* — Robert C. Kowert; Kowert, Hood, Munyon, Rankin & Goetzel, P.C.

(57) ABSTRACT

Hashing name resolution requests may be performed according to an identified routing policy. A query from a Domain Name System (DNS) resolver to lookup a name in a first collection of name records may be received. A hash function may be applied to the name to generate a hash value according to a routing policy for the first collection of name records that determines which name record in the first collection of name records is used to answer the query. A name record in the collection of name records may be identified according to a mapping request for the name record using the hash value and a value for the name record may be returned to the DNS resolver. The value for the name record may identify a second collection of name records to query as part of determining the network address at the DNS resolver.

20 Claims, 9 Drawing Sheets

HASHING NAME RESOLUTION REQUESTS ACCORDING TO AN IDENTIFIED ROUTING POLICY

BACKGROUND

The Domain Name System (DNS) undergirds much of the network traffic routing supporting many different network-based systems and services (e.g., Internet-based services). Because DNS systems facilitate communications amongst multiple different systems and services, often operated or owned by different entities, DNS system attributes, features, performance, or other capabilities may affect the performance of the devices, systems, and services which rely upon DNS systems to receive or send out communications. Therefore, techniques that increase the capabilities by which DNS systems can resolve domain name requests are highly desirable.

Figure 1:
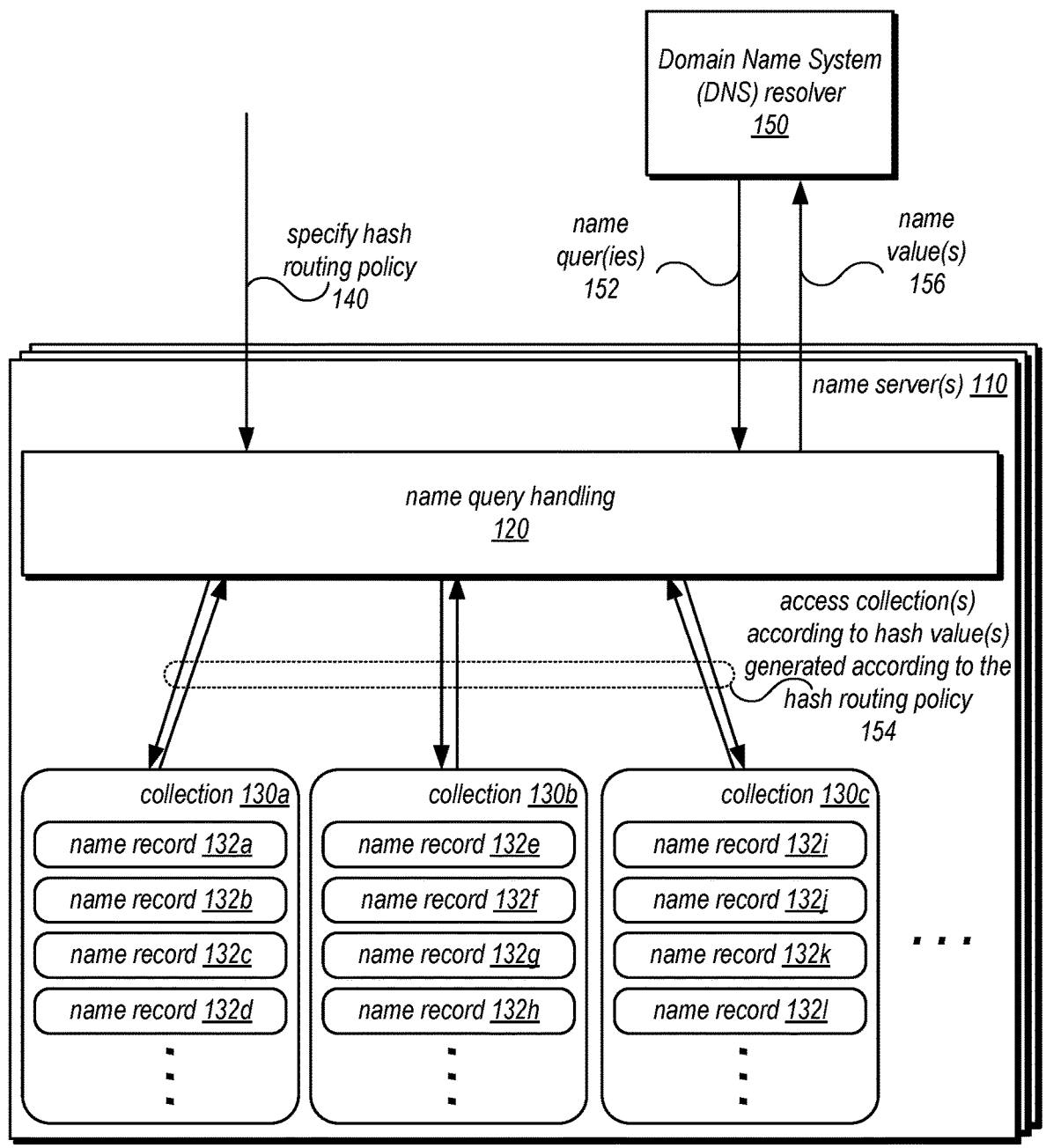
FIG. 1 is a logical block diagram illustrating hashing name resolution requests according to an identified routing policy, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Techniques described herein may implement hashing name resolution requests according to an identified routing policy in various embodiments. The Domain Name System (DNS) may be implemented in various public and private network environments in order to utilize domain names to direct network traffic to resources located at a network address corresponding to the resource. DNS may implement a protocol by which requests for domain names may be resolved (e.g., mapped to) to a network address, in various embodiments. For example, an application, such as a web site, may utilize a domain name for a database, or other back-end storage system, to direct access requests to the database in order to generate and serve a web page to a web browser application.

DNS may include multiple different name servers that serve as authoritative sources of information to resolve mappings between domain names (or sub-domains) and the corresponding network address, in some embodiments. For example, different name servers may be assigned responsibility for resolving requests in different name spaces of a domain or sub-domain by storing (or otherwise obtaining access to) name records that map a domain name (or portion thereof) to another name server (e.g., by storing a name alias such as a Canonical Name (CNAME)) or network address (e.g., an Internet Protocol (IP) address, such as an IP version 4 or version 6 address).

In order to manage large numbers of domain names, some name servers (e.g., implemented as part of a DNS service as discussed below with regard to FIGS. 2-5) may group or associate name records for name resolution requests as collections (e.g., lists, groups, databases, zones, or other associations that can represent a collection of one or more name records). However, management of these collections can introduce scaling and security risks. For example, a collection of name records can grow very large (e.g., in cloud-based, Internet-based, or other network-based services, a collection of name records that provide access to resources hosted in the services via a domain name specific to a resource may need to manage and/or resolve requests for thousands, hundreds of thousands, or millions of resources hosted in the services), making a single collection of records a failure point of high impact (e.g., a large blast radius that could lead to partial or total failure of numerous resources or services due to the inability to correctly route network traffic according to name records in a collection). Moreover, unauthorized accessed to the single collection of records could expose an entire network architecture to malicious actors if compromised. Thus, in various embodiments, a routing policy may be identified for name resolution requests that generate a hash value according to a name included in the requests, which may be used to identify the appropriate collection of name records in which to find the name record to resolve the request.

Figure 8:
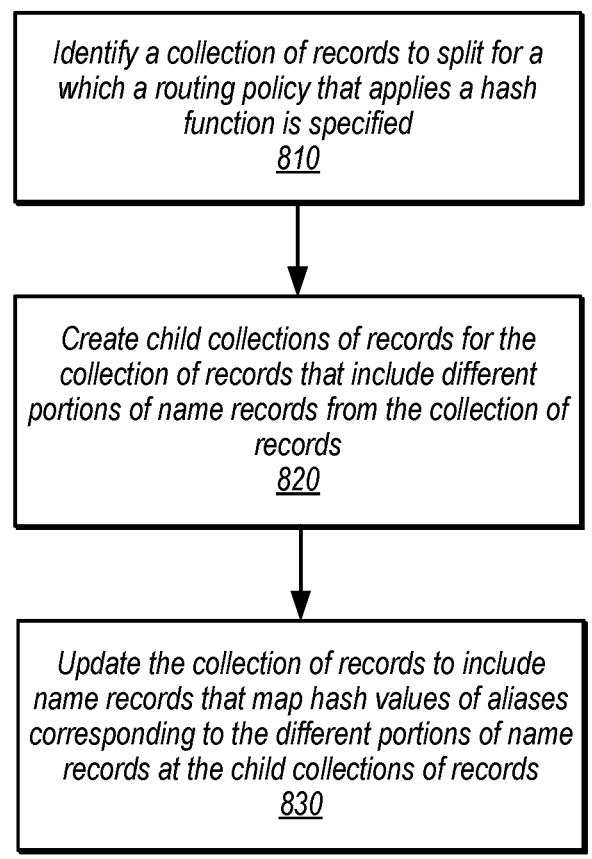
FIG. 8 is a high-level flowchart illustrating various methods and techniques for splitting a collection of name records into child collections of name records, according to some embodiments.

For example, multiple different collections of records can be created to distribute name records in a tree-like structure, as discussed below with regard to FIGS. 4, 5, and 8 in order to lower the impact of failure (e.g., reduce the blast radius)

of any one collection of records by distributing name records across collections according to hash values generated as specified by the routing policy. Additionally, the domain name could be encoded (e.g. as the hash value used for the lookup when stored in the name records to prevent an unauthorized user viewing a collection of records from discerning information about network architecture based on the domain names. Thus, hashing name resolution requests according to an identified routing policy can improve the performance of devices, systems, or services by preventing the adverse effects of high impact failures and exposure to malicious actors.

FIG. 1 is a logical block diagram illustrating hashing name resolution requests according to an identified routing policy, according to some embodiments. Name server(s) 110 (e.g. implemented on a computing system 1000 discussed with regard to FIG. 9 below) may be implemented by various public and private networks to accept requests or other queries to lookup name values for names included in the query, such as name quer(ies) 152. DNS resolvers, such as DNS resolver 150 (e.g. implemented on a computing system 1000 discussed with regard to FIG. 9 below), may interact with name server(s) 110 on behalf of a client application in order to provide the client application (not illustrated) with a network address for a resource which the client application is attempting to access. For example, a client application may be a web browser that receives a domain name, "www.example.com" via a text input element (e.g., an address bar of the web browser). The web browser may submit a request to a DNS resolver, like DNS resolver 150, which may then check a store of cached network addresses for "www.example.com." If the network address is not stored, then the DNS resolver may submit requests to one (or multiple) name servers, like name server 110, in order to resolve the network address for the domain name based on the name value(s) returned from name server(s) 110. Note that a DNS resolver may be a role performed by a name server that maintains a cached collection of name records, in various embodiments.

Some name servers 110, such as a DNS root name server, may return values for the name which may cause DNS resolver 150 to submit a new request to a different name server (e.g., a top level domain (TLD) name server for the ".com" portion of the domain name) with either the same name value or a different name value received from the prior name server. Such a technique may be performed multiple times until a name server returns a network address for the resource, which DNS resolver 150 may return to the web browser in order for the web browser to display the web page served from the network address.

Some name server(s) 110 may provide access to one or more collections of name records, such as collections 130a, 130b, and 130c, that include name records 132a, 132b, 132c, 132d, 132e, 132f, 132g, 132h, 132i, 132j, 132k, and 1321 respectively. For example a name server 110 for a particular network-based resource (e.g., a database or other data store, a web page, etc.) hosted or offered as part of a larger group of similar resources (e.g., other databases hosted by a same service or web sites hosted by a same service), may store name records 132 that describe values for resolving the network address for the name at DNS resolver 150 as part of a collection 130 so that the service can manage the name records 132 as a group (e.g., so that each record can be managed as part of the collection instead of standing up separate name servers for each resource and tracking the location of name servers for each resource).

Name records 132, as discussed in detail below with regard to FIG. 3, may include information, such as the name value, type of name record, alias information (if any), time-to-live (TTL) information, and routing policy, in some embodiments, and be created or updated in a collection 130. As part of creating or updating the name record 132, a routing policy may be specified for the name record that specifies the use of a hash function to identify which collection of name records includes the name record that provides the network address for the name. For instance, an interface (e.g., graphical, programmatic, or command line) may be used to submit a request that specifies the routing policy for a name record as a hash routing policy, as indicated at 140. In some embodiments, the routing policy may indicate what hash function is used and to what portion of the name in the request the hash function is applied (e.g., some or all) to generate hash value according to which the name record for that name value request can be identified.

Consider an example where two different name records 132 correspond to two different name records:

[RECORD 1] *.example.com HASH ALIAS 0 10.0.0.1
[RECORD 2] *.example.com HASH ALIAS 1 10.0.0.2

A name value request may be received at a name server with a name "resource1.example.com". The routing policy specified for these records may be applied to choose the hash alias value "k" where "hash function(resource1.example.com) mod 2=k". For instance, if "k" were equal to "0" then the name value returned would be network address "10.0.0.1" or if "k" were equal to "1" then the name value returned would be network address "10.0.0.2". In some embodiments, "salt" may be added to the hash function as an additional input variable to ensure that a different hash value may result even if the same input were applied—though in other embodiments salt may not be applied so that the same input applied to the hash function does result in the same hash value).

Although the above example gives network addresses as the value pointed to be the hash alias, the value could be another domain name, which could then be submitted again to a name server 110 for resolution by DNS resolver 150. Thus, the name values returned by name server 110 could point to different collections of name records (e.g., as discussed in detail below with regard to FIGS. 4 and 5) until the collection that stores the name record is located and searched (e.g., a first name value request 152 could identify name record 132b in collection 130a, which would provide another domain name value that is located in collection 130b in name record 132h, which would provide another domain name value that is found in collection 130c in name record 132i, which may provide a network address.

Figure 6:
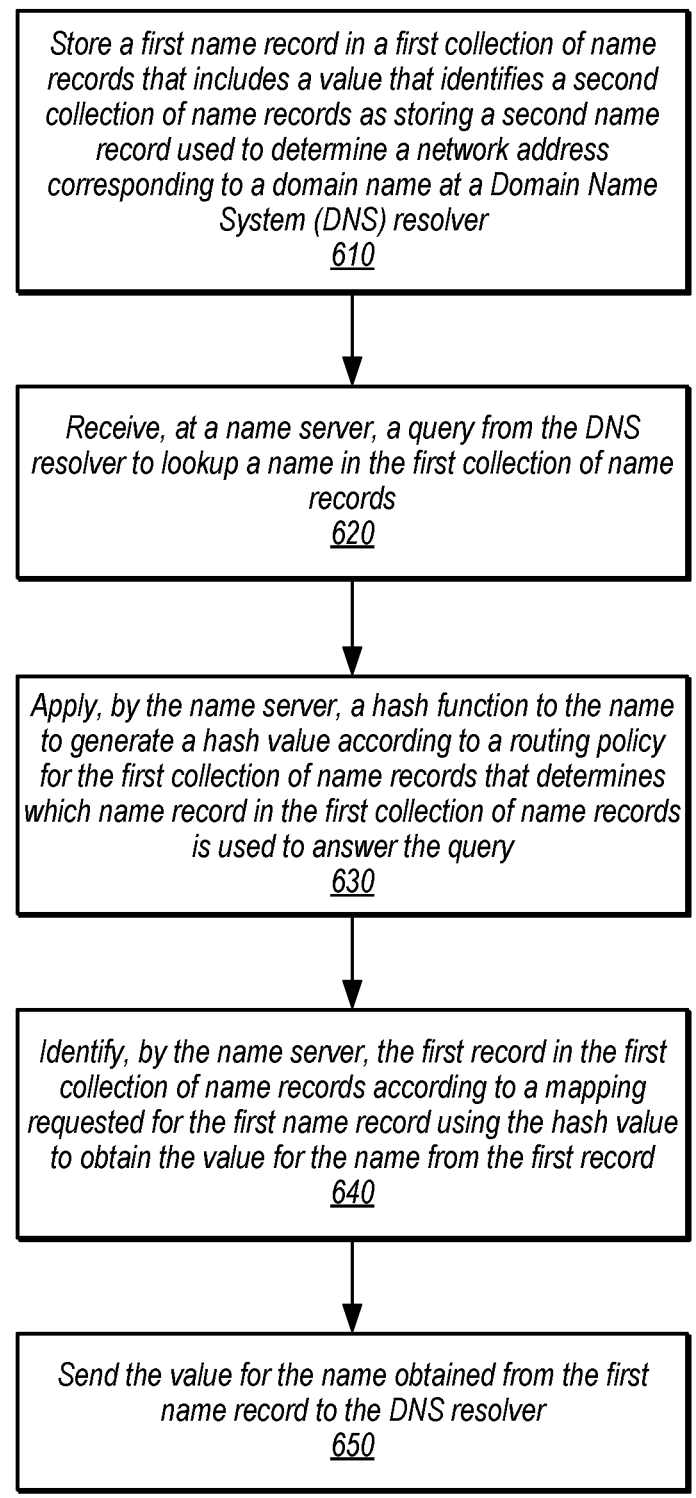
FIG. 6 is high-level flowchart illustrating various methods and techniques that implement hashing name resolution requests according to an identified routing policy, according to some embodiments.

Name server(s) 110 may implement name query handling 120 to identify the routing policy to locate a collection of name records for a name value request, as discussed below in FIG. 6. Name query handling may then access 154 the appropriate collection of records 130 (e.g., in local storage or in a remote data store accessible to the name server, such as a remote database) according to hash value generated from the name in the name value request. A name value may be returned 156 to DNS resolver 150, which may provide the same domain name (and a different name server), another domain name, or a network address according to the name record 132 corresponding to the domain name in the collection 130, in various embodiments.

Please note that previous descriptions are not intended to be limiting, but are merely provided as examples of DNS resolvers, name servers, name value requests, name value, and name records. Various other implementations of these features, including those discussed below, may implement the techniques discussed above.

This specification next includes a general description of a provider network, which may include a DNS service that implements hashing name resolution requests according to an identified routing policy. Then various examples of DNS are discussed, including different components, or arrangements of components that may be employed as part of implementing a DNS service. A number of different methods and techniques to implement hashing name resolution requests according to an identified routing policy are then discussed, some of which are illustrated in accompanying flowcharts. Finally, a description of an example computing system upon which the various components, systems, devices, and/or nodes may be implemented is provided. Various examples are provided throughout the specification.

Figure 2:
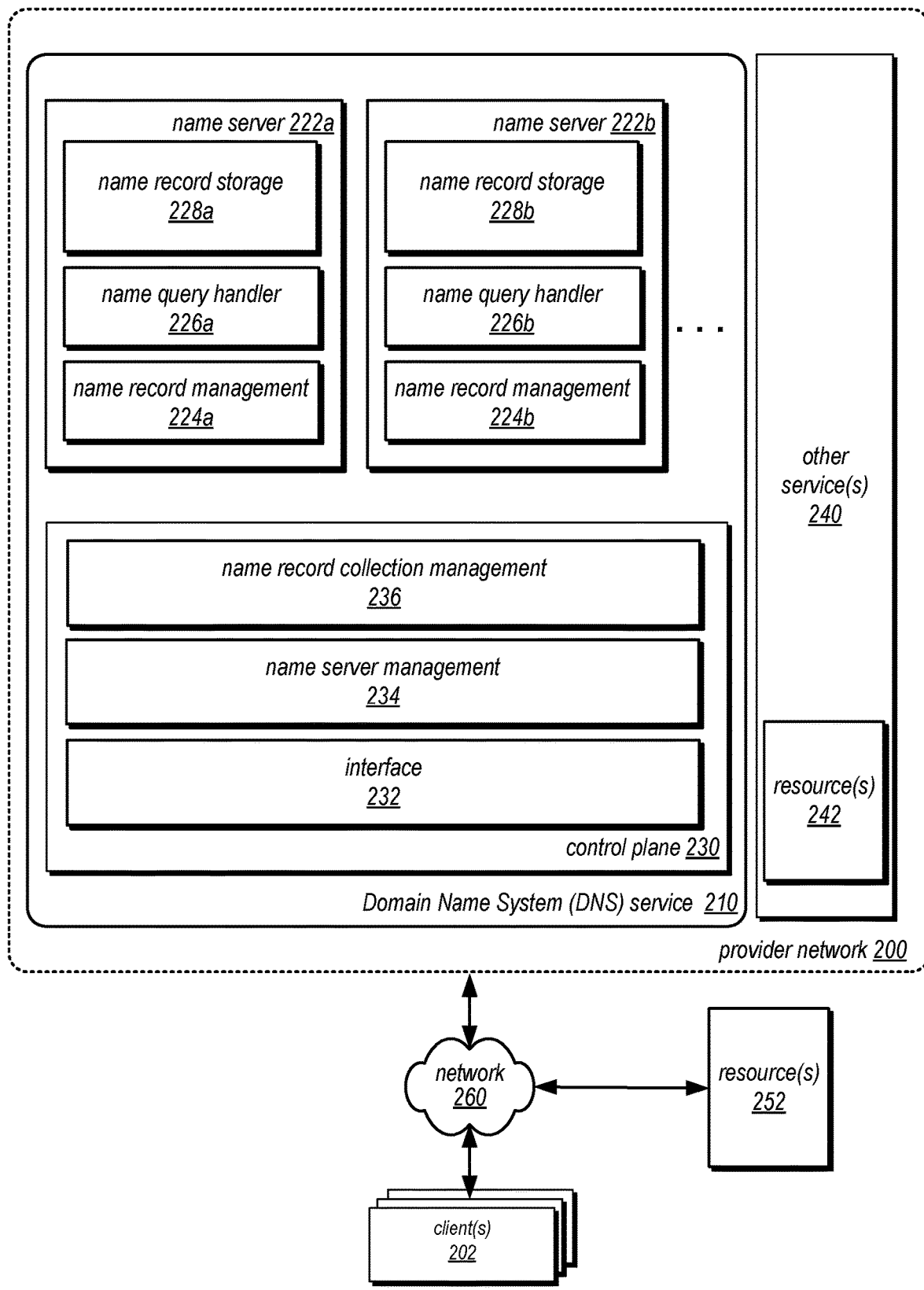
FIG. 2 is a logical block diagram illustrating a provider network that includes a Domain Name System (DNS) service, according to some embodiments.

FIG. 2 is a logical block diagram illustrating a provider network that includes a Domain Name System (DNS) service, according to some embodiments. Provider network 200 may be a private or closed system or may be set up by an entity such as a company or a public sector organization to provide one or more services (such as various types of cloud-based storage) accessible via the Internet and/or other networks to clients 202. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may implement a Domain Name System (DNS) service 210 as well as various other services 240, such as database service(s), (e.g., a map reduce service, a data warehouse service, relational database services, non-relational database services (e.g., NoSQL) and other database services), data processing services (e.g., virtual compute services or event-driven compute services), and data storage services (e.g., object storage services or block-based storage services that may implement a centralized data store for various types of data), and/or any other type of network based services (which may various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below (e.g., a host server that implements one (or more) nodes of a service). In various embodiments, the functionality of a given system or service component (e.g., a component of DNS service 210 or other service(s) 240) may be implemented by a particular node or may be distributed across several nodes. In some embodiments, a given node may implement the functionality of more than one service system component (e.g., more than one control plane 230 component).

In various embodiments, DNS service 210 may connect client application requests to route network traffic to resources hosted with provider network 200, such as resources 242, resources external to provider network 200, such as resources 252, by providing a reliable, highly available, and scalable set of resources to resolve DNS name value requests (e.g., DNS queries). DNS service 210 may implement one or more name servers, such as name servers 222a and 222b, which may be provisioned on behalf of users to server as name servers for domain names, such as domain names of resources 242 and 252. DNS service 210 may implement a control plane 230 to provide various management user control and management features for name servers 222 in order to configure name records stored to resolve name value requests.

DNS service 210 may implement control plane 230 which may implement various internal management and service control features as well as support user management and configuration. For example, control plane 230 may implement an interface, such as interface 232, which may be a graphical user interface (GUI) hosted on a web site or other control panel, command line interface, and/or programmatic interface (e.g., Application Programming Interfaces (APIs)) to support different features, such as those discussed below with regard to FIG. 3). For example, interface 232 may dispatch requests to create or update collections of records to name record collection management 236, which may provision or identify name servers 222 for placing a new collection of name records. Name record collection management 236 may, in some embodiments, move collections of name records from one name server 222 to another (e.g., to load balance name server workload in multi-tenant or multi-collection hosting scenarios or to move collections off failing, failed, or low performing hosts of a name server).

Control plane 230 may implement name server management 234, in some embodiments, in order to monitor the health and/or performance of name servers 222. For example, name server management 232 may perform operations to provision additional name servers, move record collections, repair name servers, update name servers (e.g., via software patches), or otherwise handle failure or performance events to ensure that a minimum service level (e.g., as may be specified in a Service Level Agreement (SLA)) is met by name servers 222 for users. For example, name server management may cause installation, creation, shutdown, update, or other processes or workflows to be performed on host systems 1000 of a name server 222 by sending instructions, data, executables, and/or other information to complete the processes or workflows.

Name servers 222 may be implemented as virtual name server (e.g., a name server virtual machine hosted on a computing system 1000 as part of virtual compute resources offered by another service 240 of provider network 200), or as physical server that executes a name server application to store, manage and process requests for name values. Name servers 222 may implement name record management, such as name record management 224a and 224b, which may process requests to add, update, or delete name records stored in a collection of records accessible to a name server 222. In some embodiments, these requests may be directly sent to a name server from a client application (not illustrated) or as illustrated in FIG. 3 a name server may receive requests dispatched from control plane 230 to perform various collection and/or name record management operations.

Name servers 222 may implement a name query handler, such as name query handlers 226a and 226b, to accept requests for name values, parse the requests, identify a name record that satisfies the request according to an identified routing policy, such as a hash routing policy as discussed below, and return the appropriate information from the name record (e.g., the identity, such as the network address, of another name server to query, another domain name to query (e.g., an alias name, like a CNAME), and/or other information used to continue the processes of resolving a domain name at a DNS resolver. For example, name query handler 226 may implement different query processing plans for different routing policies, like a plan for performing a hash routing policy that includes operations to generate a hash value by applying a hash function to the name submitted as a lookup predicate in a query, performing a scan/filter operation to identify a hash alias with a matching value (or the hash value may be used to generate an index value which may be an index to the appropriate entry in a collection of name records), read the value of the name record (e.g., the network address value or CNAME), and return the value of the name record. In some embodiments, name query handler 226 and name record management 224 may support encoding of values for names (e.g., using hash-based encoding which may (or may not) be different from the hash encoding used to identify records, such as a cryptographically secure one-way hash like SHA256, although other hash functions like CRC-32 may be used in other embodiments.

Another routing policy or technique that name query handler 226 may apply in some embodiments, would be to separate a network address that corresponds to a domain name to fill in the host address portion of a prefix of the network address (e.g., in IPv6). For example, a name record that contains the network address that resolves for a domain name query may be recorded as:

\*.service.example.com IN AAAA_HASH 2600:9000:1234:abcd::/64

The record type "AAAA_HASH" may indicate that the host address portion may be returned based on a hash value generated from a hash technique (e.g., a consistent hashing technique) applied to the domain name of domain name query. In the example above, a domain name query for "resource1.service.example.com" would have a different network address value returned by query handler 226 than a domain name query for "resource2.service.example.com" because the hash of the two domain names would be different resulting in a different host address prefix for the network addresses returned.

Name servers 222 may implement name record storage, such as name record storage 228a and 228b, which may be a local (or remote) data store that stores name records to be accessed by name query handler 226 responsive to requests (e.g., name records may be stored in an underlying database which name query handler 226 may be able to access in order to read from a name record in a collection).

Although not illustrated in FIG. 2, in at least some embodiments, DNS service 210 may implement a DNS resolver, similar to DNS resolver 150 discussed above with regard to FIG. 1. In this way, DNS service 210 may provide a resolution endpoint to which domain name queries (e.g., recursive DNS queries), which may then dispatch a job to a pool of resolvers that can perform the queries to name servers to determine the network address (which may occur after first checking a cache to see if a network address has already been determined for the domain name) or to a name server 222 that may act as a DNS resolver for a request. In this way, a resolution request sent to DNS service 210 may be viewed from the perspective of a client external to DNS service 210 as a single name server that returns the appropriate network address, when internally DNS service 210 may perform a technique similar to that discussed below with regard to FIG. 4 before returning the network address. For instance, a web-browser application may initiate a request to a DNS resolver (e.g., implemented by an Internet Service Provider (ISP)), which in turn may send a various domain name queries to a root server, a TLD server, and so on until directed to query the "name server" implemented by DNS service 210, which may actually implement a similar technique with an "internal" DNS resolver that receives the domain name query from the "external" DNS resolver, perform multiple recursive domain name queries until a network address is identified and returned by the "internal" DNS resolver to the "external" DNS resolver.

Clients 202 may encompass any type of client configurable to submit requests to provider network 200. For example, a given client 202 may include a suitable version of a web browser, or may include a plug-in module or other type of code module configured to execute as an extension to or within an execution environment provided by a web browser. Alternatively, a client 202 may encompass an application such as a DNS resolver, a web application (or user interface thereof) that utilizes an internal provider network DNS resolver, a media application, an office application or any other application that may make use of various provider network resources, including name servers 222 to perform various operations. In some embodiments, such an application may include sufficient protocol support (e.g., for DNS protocol or for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a resource in provider network 200 in a manner that is transparent to applications implemented on the client 202 utilizing computational resources provided by the resource. Client(s) 202 may be associated with particular user accounts, user identifiers, or other information which may indicate the access rights, resources, and other associated information maintained at provider network 200 that implements resources in multi-tenant fashion on behalf of a client 202. In some embodiments, clients of DNS service 210 and/or other service(s) 240 may be implemented within provider network 200 (e.g., an object storage service of provider network 200 may utilize DNS service to manage domain names that provide direct access to stored objects or containers of stored objects within the object storage service or submit domain name queries in order to access a resource hosted within provider network 200) to implement various service features or functions and thus various features of client(s) 202 discussed above may be applicable to such internal clients as well.

Clients 202 may convey network-based services requests to provider network 200 via network 260. In various embodiments, network 260 may encompass any suitable combination of networking hardware and protocols necessary to establish network-based communications between clients 202 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 202 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and provider network 200. It is noted that in some embodiments, clients 202 may communicate with provider network 202 using a private network rather than the public Internet.

Figure 3:
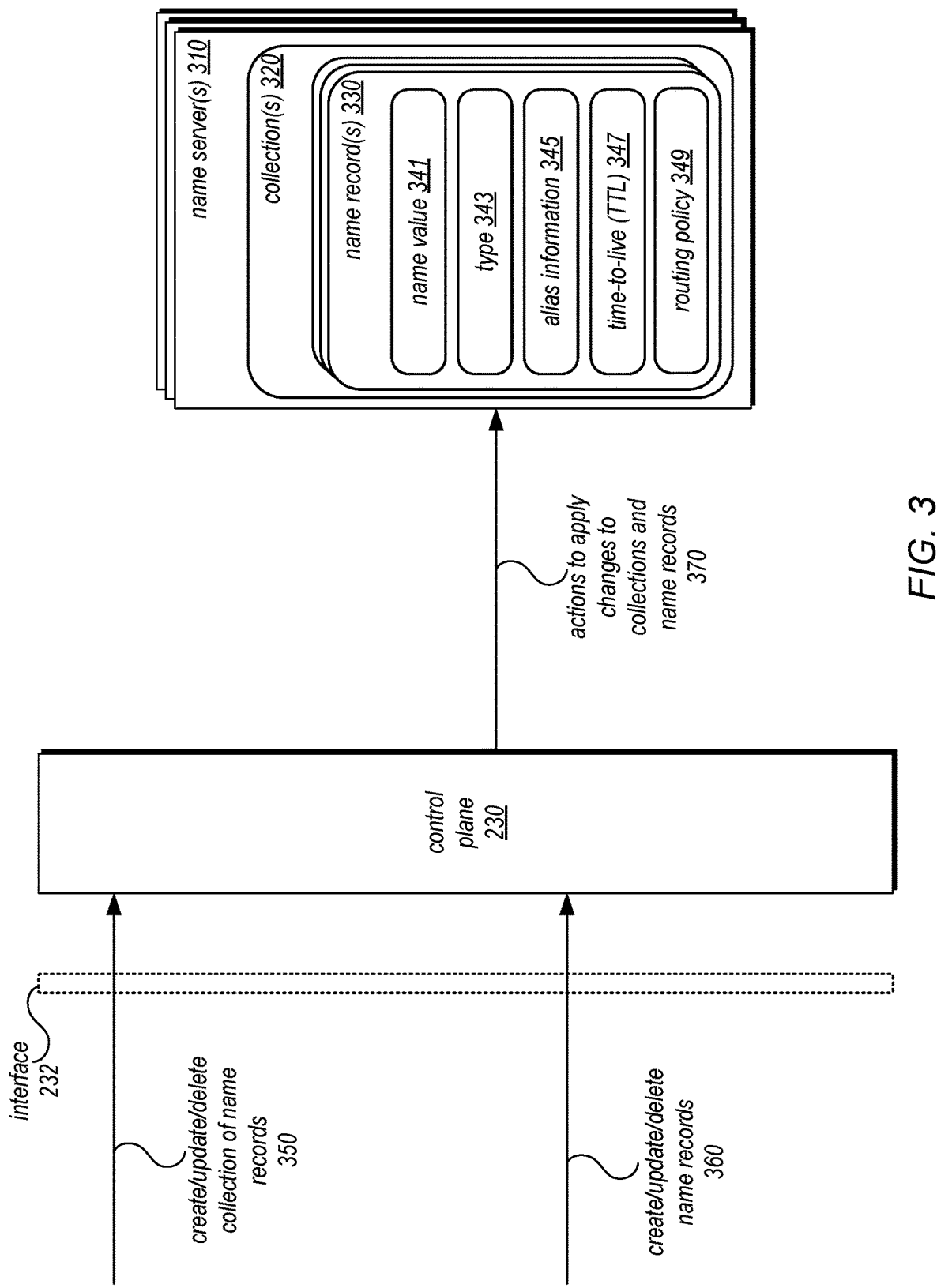
FIG. 3 is a logical block diagram illustrating interactions to manage name records or collections of name records hosted at a DNS service, according to some embodiments.

FIG. 3 is a logical block diagram illustrating interactions to manage name records or collections of name records hosted at a DNS service, according to some embodiments. For example, control plane 230 may receive requests via interface 232 to create, update, or delete a collection of name records, as indicated at 350. Control plane 230 may dispatch or perform actions 370 to apply the requests to collection(s) of name records at the appropriate name servers, such as name server(s) 310, hosting, storing, or otherwise providing access to collection(s) of name records 320, that include name record(s) 330. For example, a creation request may specify values for each name record (e.g., by utilizing a document data object like JavaScript Object Notation (JSON) which can be uploaded as part of or along with the request). In other embodiments, various name record values or collections of name records may be specified as parameters or field values of an API request. Some of the information in a creation or update request directed to a collection of name records may be applied to all name records in that collection, such as name record features like type, routing policy, or time-to-live.

As indicated at 360, similar requests to create, update, and/or delete individual name records (or groups of name records) may be received via interface 232 at control plane 230, which again may dispatch or perform actions 370 to apply the requests to the name records at the appropriate name servers, such as name server(s) 310. These individual requests may create name records (e.g., by specifying a hash alias, update name records (e.g., by requesting a change to a hash alias or other mapping of a name record), or modify other name record values or features.

Name records 330 may include various information, such as the name value 341, type 343, alias information 345, time-to-live (TTL) information 347, and routing policy 349. For example, various supported name record types 343 may dictate what the name value 341 is, such as an "A" record type, that may have a name value that is an IPv4 address, an "AAAA" record type, that may have a name value that is an IPv6 address, a "CNAME" record type that has a name value that is another domain name, as well as various other record types (e.g., mail eXchange (MX), naming authority pointer (NAPTR), name server (NS), pointer (PTR), start of authority (SOA), sender policy framework (SPF), location of service (SRV), and descriptive text (TXT)). Routing policy information 349 may include an indication that, for instance, a name value is selected according to an identified hash function (or a default hash function applied to all name records with the hash routing policy specified). Multiple different routing policies in addition to a hash-based routing policy, such as weighted or round-robin routing policies, or geo-location routing policies, which may be identified in routing policy 349. Alias information 345 may be a requested mapping for a hash routing policy, such as an alias that is designated a "hash alias" as discussed below, which may, in some embodiments, indicate what output of the hash value (or a value derived from the hash value) corresponds to what name record.

Figure 4:
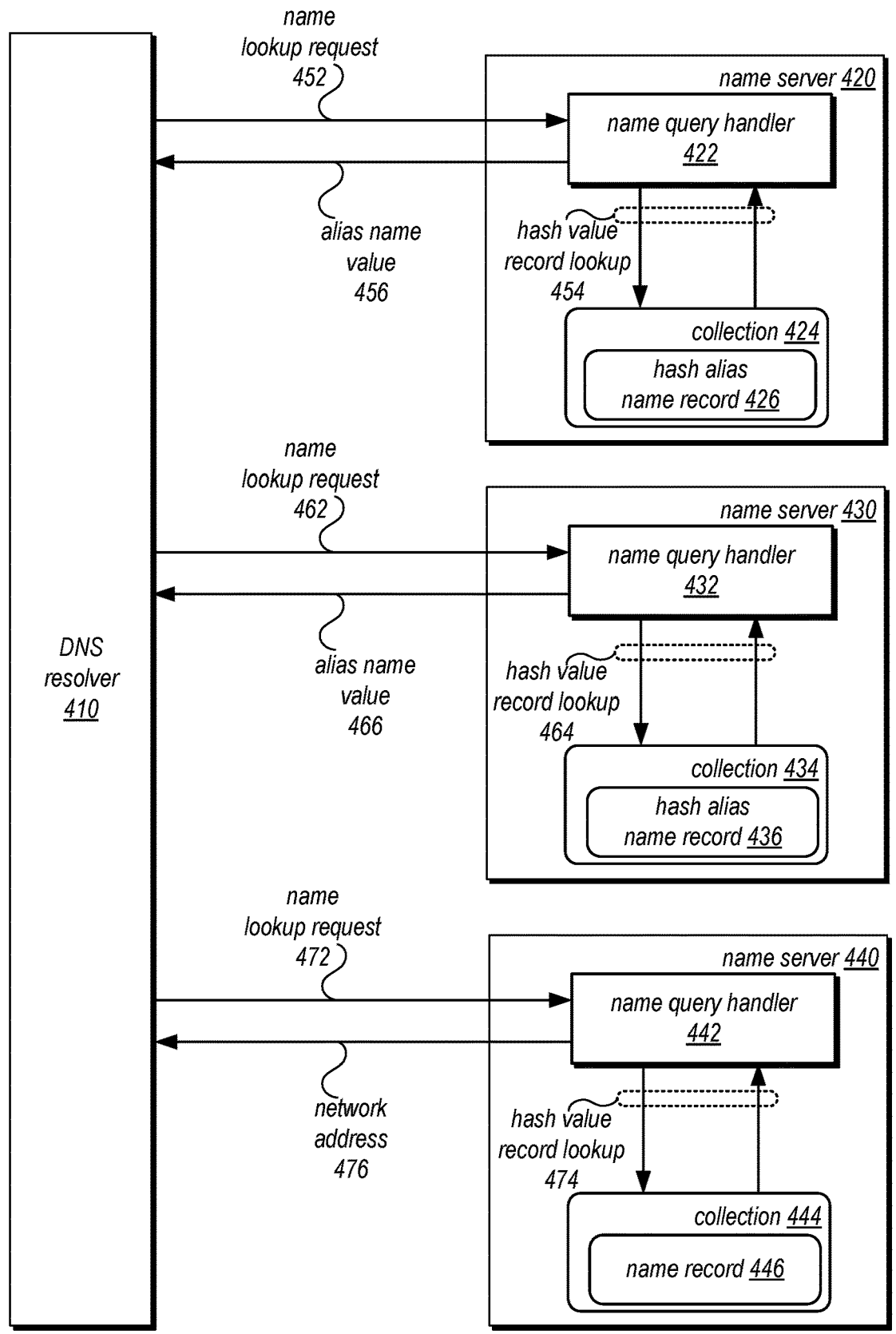
FIG. 4 is a logical block diagram illustrating interactions between a DNS resolver and name servers that handle name requests according to a routing policy that applies hashing to a name value in order to identify the collection of name records that stores a name record describing a network address for a domain name, according to some embodiments.

FIG. 4 is a logical block diagram illustrating interactions between a DNS resolver and name servers that handle name requests according to a routing policy that applies hashing to name value in order to identify the collection of name records that stores a name record describing a network address for a domain name, according to some embodiments. DNS resolver 410, may be an external DNS resolver (e.g., implemented outside of DNS service 210 or outside of provider network 200) or a DNS resolver implemented within DNS service 210 (e.g., an internal DNS resolver which may be a name server). DNS resolver 410 may perform multiple name lookup requests or queries to name servers in order to determine a network address for a domain name submitted to DNS resolver 410 (not illustrated).

For example, as indicated at 452, a name lookup request 452 may be sent to name server 420, which may process the request at name query handler 422. Name query handler 422 may generate a hash value from the name in the name lookup request, which may be used to identify a hash alias name record 426 in collection 424 (e.g., by generating an index or key value "k" from the hash value, such as by applying a "mod" function to the hash value by a number "n" of the total number records in the collection. Name query handler 422 may then return the alias name value 456 to DNS resolver 410. DNS resolver 410 may perform similar requests based on the received alias name value. For example, as indicated at 462, a name lookup request 462 may be sent to name server 430, which may process the request at name query handler 432 using the alias name received at 456 as the name value to lookup. Name query handler 432 may generate a hash value from the alias name in the name lookup request, which may be used to identify a hash alias name record 436 in collection 434. Name query handler 432 may then return the alias name value 466 to DNS resolver 410.

This technique could be repeated many times until a name record is read that includes a network address for the name value. As discussed below with regard to FIG. 5, collections of name records can be structured in a tree structure which may be traversed according to lookups determined by the specified hash routing policy. Thus, as indicated at 472, a name lookup request may be sent to name server 440, which may process the request at name query handler 442 using the alias name received at 466 (or from some other prior name lookup request) as the name value to lookup. Name query handler 442 may generate a hash value from the alias name in the name lookup request, which may be used to identify a name record 446 in collection 444, which may include a network address value (e.g., as name record 446 may be an "A" record or an "AAAA" record). Name query handler 442 may then return the network address 476 to DNS resolver 410.

Figure 5:
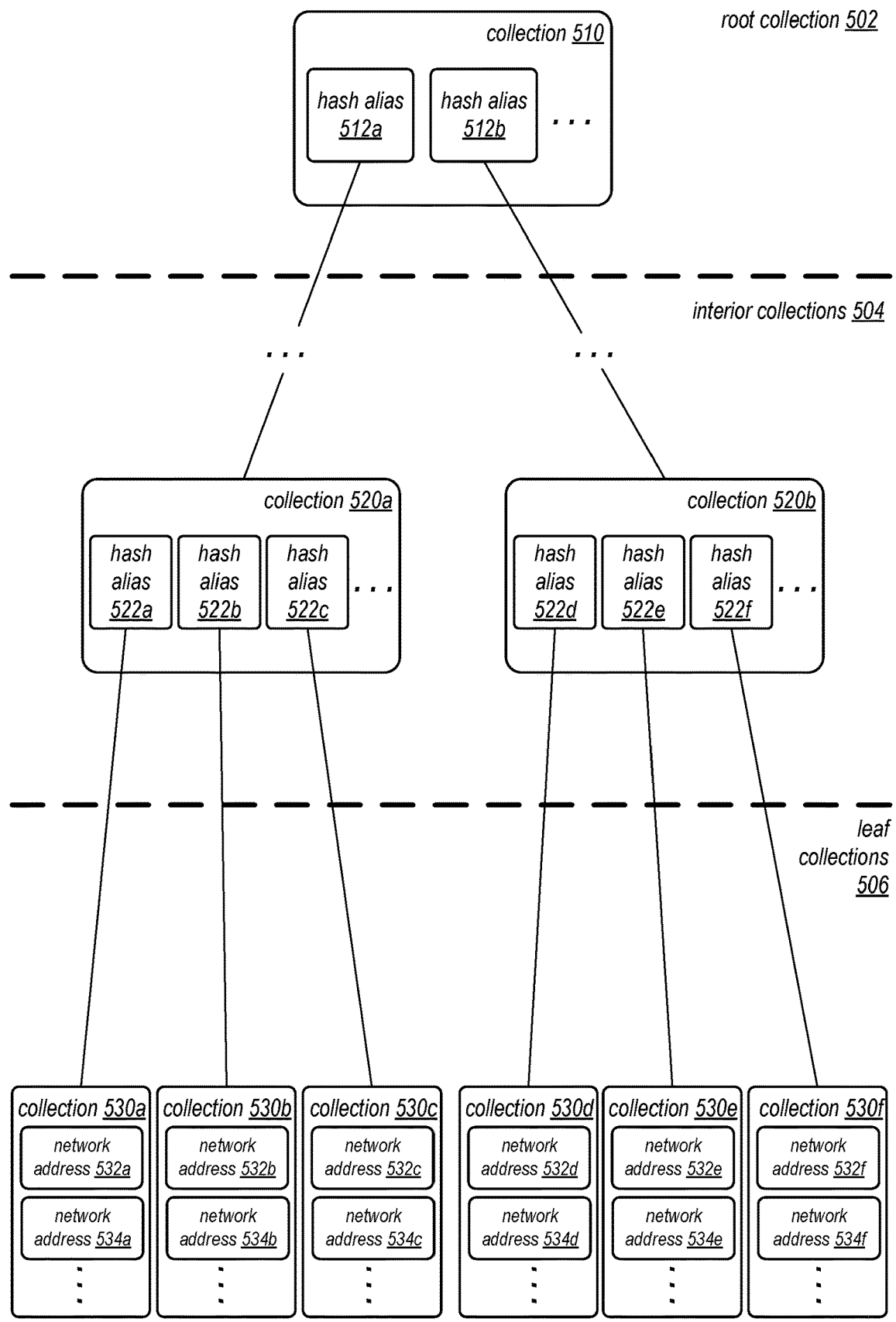
FIG. 5 is a logical block diagram illustrating example relationships between collections of name records in a tree-like structure which can be traversed according to hash aliases included in the name records of collections, according to some embodiments.

FIG. 5 is a logical block diagram illustrating example relationships between collections of name records in a tree-like structure which can be traversed according to hash aliases included in the name records of collections, according to some embodiments. As discussed above with regard to FIG. 1, the distribution of name records across multiple collections may reduce the failure costs or risks of any one collection of name records, in some embodiments. In some embodiments, collections of records may be structured to provide a tree-like structure, as illustrated in FIG. 5, (or other graph-based structure, not illustrated) so that name records in collections may be used to identify further collections of name records, one of which may include a name record with the network address that resolves a domain name query.

For example, in FIG. 5, collections of records may be organized as a root collection 502, such as collection 510, interior collections 504, such as collections 520a and 520b, and leaf collections 504, such as collections 530a, 530b, 530c, 530d, 530e, and 530f. The number of collections in interior collections 504 and leaf collections 506 can be expanded as the number of domain names grows. For example, as discussed below with regard to FIG. 8, a child collection can be added by removing some name records into the child collections of the collection to be split (e.g., additional child collections could be created and linked to collection 520b by moving some name records present in collection 520b to the add child collections) and including hash alias to point to the child collections.

Collections may be traversed as individual lookup iterations between a DNS resolver and name servers, as discussed above with regard to FIG. 4. For example, a name lookup request may first be directed to a name server with a root collection 502, such as collection 510. Collection 510 may include name records with hash alias 512a and 512b, which return name values that direct subsequent lookup requests to different collections (e.g., collections 520a and 520b). Thus, when a hash value is generated to determine which hash alias corresponds to the lookup request, the hash alias may indicate which alias based on the hash value (e.g., hash value MOD total number of hash aliases in the collection). In some embodiments, a hash alias may include a wild card value (e.g., "*.a1.example.com") in order to sub-divide groups of domain names into a lower collection. For example, hash aliases 522a, 522b, 522c, 522d, 522e, and 522f may include wildcards to sub-divide domains further into different collections (e.g., hash alias 522a that points to collection 530a, hash alias 522b that points to collection 530b, hash alias 522c that points to collection 530c, hash alias 522d that points to collection 530d, hash alias 522e that points to collection 530e, and hash alias 522f that points to collection 530f).

Leaf collections 506 may include name records that are not alias records, such as network address records 532a, 532b, 532c, 532d, 532e, 532f, 534a, 534b, 534c, 534d, 534e, and 534f. A hash value could still be used to select the record (e.g., hash value MOD total number of name records in the collection). In some embodiments, a different routing policy (e.g., using weights, geo-location, round robin, or other routing technique) may be implemented in some embodiments to identify the name record with the network address to resolve a domain name at a DNS resolver.

Tree or other graph structures offer many different possible combinations for storing, managing, and access name records to resolve DNS requests. For instance, entities that utilize a large number of domain names specific to (for example) a particular resource in another service (e.g., such as a data or data object container in another service), may shard or otherwise distribute collections that corresponding to the logical and/or physical infrastructure of the resources mapped to be the record collections.

Redundancy schemes or overlapping shards of collections of records may be organized according to geographic region, data center, system implemented or other physical or logical division. For example, shards of collections of records corresponding to fault tolerance zones (e.g., one or more data centers or other grouping of provider network resources/infrastructure that are isolated from failures, such as power or networking failures, in other fault tolerance zones) maybe combined in a separate set of zonal shuffled shard collections. In an example configuration, with 5 shards per fault tolerant zone, there could be 125 combinations when choosing one shard from each fault tolerant zone. Each of these combinations may provide a unique subset of load balancers from a fleet of load balancers that are the network address identified by a name record in the collection of records. In some scenarios, name record created for each domain name may comprise an ALIAS whose target is selected by hashing the domain name to select one of the shard combinations. For instance, with 5 shards, an outage caused by any single domain name may be limited in its effect to its co-located domain names (which could make up a very small amount, 1% of the fleet).

An application utilizing a collection of domain names (e.g., a service) can be configured with more than one shard combination should a use case utilize more capacity to support the application. With 5 shards, advancing the shard combination by (5+1)×5+1=31 would select the next non-overlapping shard combination. Although this allows the application to be allocated more capacity, it does come at the cost of exposing the larger DNS name server fleet to progressively larger outages caused by a single application. Assigning K non-overlapping shard combinations to an application may allow the customer to affect $(K/5)^3$ of the fleet:

Consider an example data object storage service, which may utilize a structure similar to those discussed above to implement a cellular design for distributing collections of name records that provide a unique domain to access each data object stored the storage service (e.g., a domain name for object "ABC" may be "abc.storageservice.example-.com"). Structuring name records in collections to account for scale of object storage service may utilize a tree where the root collection of records at the tree of DNS object names may be the distinguished ancestor of all the leaf hosted zones and contains all the non-wildcard names in the s3.amazonaws.com domain, the size of any given collection records can be bounded by the size of a default collection set size, or a set of such sets, avoiding the problem of having to scale a single collection to the total number of objects in the storage service. Performance for resolving fixed names for can be unaffected by the number of DNS object names because all such names may be resolved at the root collection of records. Latency for name resolution may grow logarithmically with the number of DNS object names. A hashing technique can be used to spread the DNS object names evenly throughout the tree, so rebalancing should not have to be performed because of uneven growth alone.

The examples of implement hashing name resolution requests according to an identified routing policy as discussed above with regard to FIGS. 2-5 have been given in regard to DNS service offered by a provider network. Various other types or configurations of DNS systems that implement name servers may implement these techniques. FIG. 6 is high-level flowchart illustrating various methods and techniques that implement hashing name resolution requests according to an identified routing policy, according to some embodiments. Various ones of the systems described above may implement some or all of these techniques, as well as other systems not illustrated above.

As indicated at 610, a first name record in a first collection of name records that includes a value that identifies a second collection of name records as storing a second name record used to determine a network address corresponding to a domain name at a Domain Name System (DNS) resolver, in some embodiments. For example, as discussed above with regard to FIG. 3, an interface may support the creation of different collections of name records. Requests submitted via the interface may cause a control plane (and/or name server) to update a data store that stores name records with a new collection (or record within an existing collection). As part of storing the first name record, a routing policy, as discussed below may be specified or otherwise requested for the name record. In some embodiments, the hash-based routing policy may be applied automatically (e.g., by default without a request apply the hash-based routing policy). Some requests to store a name record may be submitted as part of a creation or other operational workflow of another system or service (e.g., a workflow to create a resource hosted in another service of provider network 200).

As indicated at 620, a query may be received from the DNS resolver to lookup a name in the first collection of name records, in some embodiments. For example, the query may be one of many queries performed by the DNS resolver as part of a recursive query technique to determine the network address that corresponds to the name so that the request may be, in some embodiments, a non-recursive query to lookup the name, as discussed below with regard to FIG. 7.

As indicated at 630, a hash function may be applied by the name server to the name to generate a hash value according to a routing policy for the first collection of name records that determines which name record in the first collection of name records is used to answer the query, in some embodiments. For example, the routing policy may apply a fair hash function to the name (e.g., to "www.example.com"). As indicated at 640, the first record in the first collection of name records may be identified according to a mapping request for the first name record using the hash value to obtain the value for the name from the first record, in some embodiments. For example, a request to create the name record (e.g., as a standalone request or as part of a request to create a collection of name records) may provide a hash alias for the name record so that a user/client application can specify determine how a name record is mapped to incoming name values. In this way, different collections of name records can be structured according to the techniques discussed above with regard to FIG. 5, and below with regard to FIG. 8, by users/client applications, increasing the organizational flexibility offered by traversing from one collection of name records to another. Once the first name record is identified the name value (e.g., a CNAME) that points to the second collection of name records may be obtained. As indicated at 650, the value for the name obtained from the first name record may be send in response to the query, in some embodiments.

Figure 7:
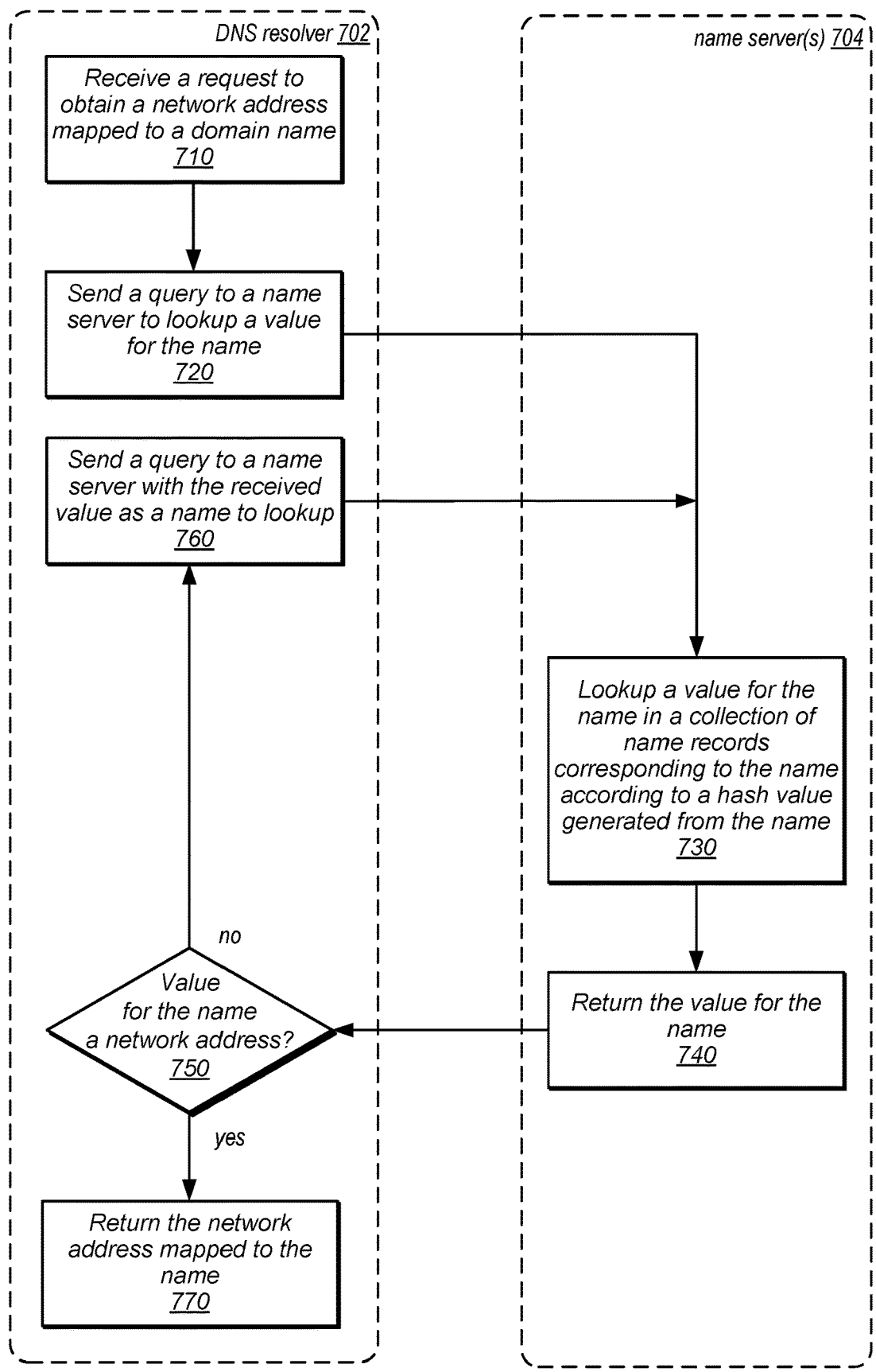
FIG. 7 is a high-level flowchart illustrating various methods and techniques for determining a network address for a domain name across multiple collections of name records according to routing policy that applies a hashing function to name queries, according to some embodiments.

FIG. 7 is a high-level flowchart illustrating various methods and techniques for determining a network address for a domain name across multiple collections of name records according to routing policy that applies a hashing function to name queries, according to some embodiments. A DNS resolver 702 (e.g., similar to DNS resolvers discussed above with regard to FIGS. 1, 4, and 6) may receive a request to obtain a network address mapped to a domain name, in some embodiments. The request may be a recursive name query, in some embodiments. Although not depicted in FIG. 7, some quer(ies) to name servers that do not apply a routing policy that uses a hash value generated from the name in the query may be applied (e.g., name queries to root name servers, TLD name servers, etc.).

As indicated at 720, DNS resolver 702 may send a query to a name server (e.g., name server 704, which may be similar to name servers discussed above with regard to FIGS. 1, 2, 3, 4, and 6) for a value for the name, in some embodiments. Name server 704 may perform a lookup for a value for the name in a collection of name records corresponding to the name according to a hash value generated from the name, in some embodiments, as indicated at 730. For instance, a hash value may be generated and then the hash value may be mapped to one of the name records in the collection of name records according to an identifier or other information in the record that maps the hash value to a name record. Then, as indicated at 740, the value for the name record may be returned to DNS resolver 702.

As indicated at 750, DNS resolver 702 may evaluate whether the value for the name is a network address. If so, then the network address mapped to the name may be returned, as indicated at 770. If not, then a query may be sent to a name server (which may be the same or different name server that sent the previous response) with the received value as a name to lookup, as indicated at 760. The collection of records searched may be different in some embodiments (e.g., as another location or level in the structure of collection of records may be have been reached when sending the query). As indicated by the potential for multiple iterations, hash values may be used to lookup multiple different name records leading to multiple different collections of name records until a network address is returned, in some embodiments.

As discussed above, different structures may be created from linking collections of name records. Automated workflows for adding name records for new resources in a service, for example, may also implement techniques to manage the structure when making changes, such as an addition. FIG. 8 is a high-level flowchart illustrating various methods and techniques for splitting a collection of name records into child collections of name records, according to some embodiments, which may accommodate additional name records being added for example. As indicated at 810, a collection of records for which a routing policy that applies a hash function is specified may be identified to split, in some embodiments. For example, a size boundary or limitation on a number of name records that can be maintained in a collection may be exceeded or met. In other embodiments, a split may be identified based on performance metrics of the collection (e.g., the collection receives a high volume of requests that could be shared amongst multiple collections after a split event).

As indicated at 820, child collections of records for the collections of records that include different portions of name records from the collection of records may be created, in some embodiments. For example, a split request (e.g., an API) may specify, allow for, or start execution of a workflow to create multiple child collections, indicate which portions of records belong in which child collection, and operations to update the parent collection of records to point the child collections of name records. In some embodiments, various combinations of collection and/or record management requests as discussed above with regard to FIG. 3 may be used to accomplish the creation of child collections of records.

As indicated at 830, the collection of records may be updated to include name records that map hash values of aliases corresponding to the different portions of name records at the child collections may be updated, in some embodiments. For example, a wildcard name value may be added or updated as a Hash alias at an existing name record (such that the parent collection is no longer a leaf collection), in some embodiments. For example, an example parent collection may originally include:

*.reg1.example.com ALIAS w.service3.example.com
resource1.service3.example.com ALIAS
w.region1.service3.example.com resource2. service3.example.com ALIAS w.region2.example.com Then, children collections may be created, name "00.service3.example.com" and "01.service3.example.com" split from the parent collection:
00.service3.example.com
*.service3.example.com ALIAS w.service3.example.com
resource1.service3.example.com ALIAS w.service3.example.com
01.service3.example.com
*.service3.example.com ALIAS w.service3.example.com
Resource2.service3.example.com ALIAS w.service3.example.com Then the parent may be updated so that:
0.service3.example.com
*.service3.example.com HASH ALIAS 0 00.service3.example.com
*.service3.example.com HASH ALIAS 1 10.service3.example.com The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
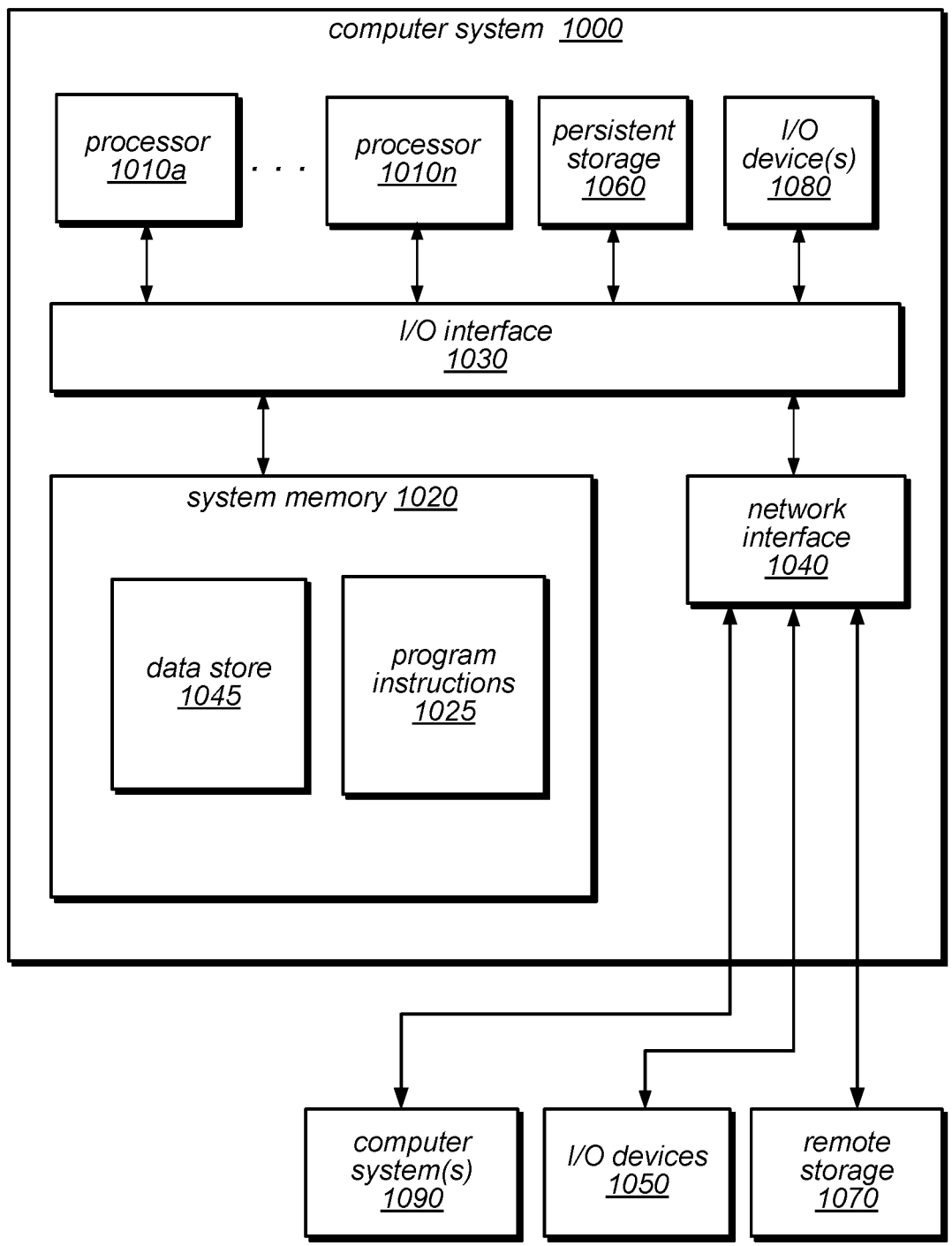
FIG. 9 is a block diagram illustrating an example computing system, according to some embodiments.

Embodiments of hashing name resolution requests according to an identified routing policy may be executed on one or more computer systems, which may interact with various other devices. FIG. 9 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the data warehouse system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a multi-tenant provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A system, comprising:
a plurality of computing devices, respectively comprising at least one processor and a memory that implement a Domain Name System (DNS) service;
wherein the DNS service comprises a name server, the name server configured to:

responsive to a request received via an interface for the DNS service, store a first name record in a first collection of name records of a plurality of collections of name records that includes a value that identifies a second collection of name records out of the plurality of collections, wherein the second collection stores a second name record used to determine a network address corresponding to a domain name at a Domain Name System (DNS) resolver;
receive a query from the DNS resolver to lookup a name in the first collection of name records;
apply a hash function to the name to generate hash value according to a routing policy for the first collection of name records that determines which name record in the first collection of name records is used to answer the query;
identify the first name record in the first collection of name records according to a mapping requested for the first name record using the hash value;
read the value for the name from the first record; and
send the value for the name read from the first name record to the DNS resolver.

2. The system of claim 1, wherein the value of the second name record is a network address.

3. The system of claim 1,
wherein to store the first name record in the first collection of name records, the name server is configured to encode the name according to the hash function or a different hash function.

4. The system of claim 1, wherein the DNS service is implemented as part of a provider network, wherein the provider network implements another network-based service that hosts a resource corresponding to the domain name, wherein the request to store the first name record is sent by the other network-based service as part of a workflow to create the resource.

5. A method, comprising:
storing a first name record in a first collection of name records of a plurality of collections of name records that includes a value that identifies a second collection of name records out of the plurality of collections, wherein the second collection stores a second name record used to determine a network address corresponding to a domain name at a Domain Name System (DNS) resolver;
receiving, at a name server, a query from the DNS resolver to lookup a name in the first collection of name records;
applying, by the name server, a hash function to the name to generate hash value according to a routing policy for the first collection of name records that determines which name record in the first collection of name records is used to answer the query;
identifying, by the name server, the first name record in the first collection of name records according to a mapping requested for the first name record using the hash value to obtain the value for the name from the first record; and
sending, by the name server, the value for the name obtained from the first record to the DNS resolver.

6. The method of claim 5, wherein the first collection of name records is a root collection of name records for a plurality of different collections of name records including the first collection of name records and the second collection of name records linked according to respective hash aliases stored in respective name records of the different collections of name records.

7. The method of claim 5, further comprising:
receiving, at the name server or another name server, a query from the DNS resolver to perform a lookup at the second collection of name records using the value of the first name record;
applying, by the name server or the other name server, a different routing policy to identify the second name record to obtain a value for the second name record, wherein the value for the second name record is a network address; and
sending, by the name server or the other name server, the network address obtained from the second name record to the DNS resolver.

8. The method of claim 5, wherein storing the first name record in the first collection of name records is performed responsive to a request to update the first name record, wherein the request specifies a hash alias as the mapping for the first name record.

9. The method of claim 8, further comprising:
responsive to a request to create the second collection of name records, storing one or more name records including the second name record as part of the second collection of name records, wherein the one or more name records are a portion of name records stored as part of the first collection of name records; and
wherein the hash alias mapping for the first name record corresponds to the portion of the name records.

10. The method of claim 5, wherein the value of the second name record is a different name than the name of the query.

11. The method of claim 5, wherein storing the first name record in the first collection of name records is performed responsive to a request to create the first collection of name records, wherein the request specifies a hash alias as the mapping for the first name record.

12. The method of claim 5,
wherein storing the first name record in the first collection of name records comprises encoding the name in the first name record according to an encoding scheme.

13. The method of claim 5, wherein the name server is implemented as part of a Domain Name System (DNS) service and wherein the routing policy for the first collection of name records is specified by a request received via an interface.

14. One or more non-transitory, computer-readable storage media, storing program instructions that when executed on or across one or more computing devices cause the one or more computing devices to implement a name server that implements:
receiving a query from a Domain Name System (DNS) resolver to lookup a name in a first collection of name records of a plurality of collections of name records, wherein the query is sent as from the DNS resolver as part of determining a network address corresponding to a domain name at the DNS resolver;
applying a hash function to the name to generate a hash value according to a routing policy for the first collection of name records that determines which name record in the first collection of name records is used to answer the query;
identifying a first name record in the first collection of name records according to a mapping requested for the first name record using the hash value;

obtaining the value for the name from the first name record, wherein the value identifies a second collection of name records out of the plurality of collections, wherein the second collection stores a value of a second name record returned responsive to a query to perform a lookup at the second collection of name records using the value of the first name record to determine the network address at the DNS resolver; and sending the value for the name obtained from the first name record to the DNS resolver.

15. The one or more non-transitory, computer-readable storage media of claim 14, wherein the first collection of name records and the second collection of name records are part of a larger plurality of different collections of name records linked according to respective hash aliases stored in respective name records of the different collections of name records.

16. The one or more non-transitory, computer-readable storage media of claim 14, storing additional program instructions that further cause the name server to implement:

responsive to a request to create a name record in the first collection of name records, storing the first name record in the first collection of name records, wherein the request specifies a hash alias as the mapping for the first name record.

17. The one or more non-transitory, computer-readable storage media of claim 14, wherein the value of the second name record returned responsive to the query to perform the lookup at the second collection of name records using the value of the first name record is a network address.

18. The one or more non-transitory, computer-readable storage media of claim 14, wherein the name server is implemented as part of a Domain Name System (DNS) service and wherein the mapping is requested for the first name record via an interface for the DNS service.

19. The one or more non-transitory, computer-readable storage media of claim 14, wherein the value is a portion of a network address;

wherein the one or more non-transitory, computer-readable storage media store further program instructions that cause the name server to implement using the hash value to determine a host address portion of the network address; and wherein, in sending the value for the name obtained from the first name record to the DNS resolver, the program instructions cause the name server to implement sending as a combined address the host address portion and the portion of the network address.

20. The one or more non-transitory, computer-readable storage media of claim 14, wherein the first collection of records and the second collection of records are part of a larger plurality of different collections of name records that correspond to different shards of a redundancy scheme for name records.

* * * * *